(12) United States Patent
Mikasa et al.

(10) Patent No.: US 12,078,220 B2
(45) Date of Patent: Sep. 3, 2024

(54) CLUTCH UNIT

(71) Applicants: TOYOTA BOSHOKU KABUSHIKI KAISHA, Kariya (JP); NTN CORPORATION, Osaka (JP)

(72) Inventors: Kunihiro Mikasa, Fujisawa (JP); Yasumasa Hibi, Iwata (JP); Kyohei Sasanuma, Iwata (JP); Shaoluan Bian, Iwata (JP)

(73) Assignees: TOYOTA BOSHOKU KABUSHIKI KAISHA, Kariya (JP); NTN CORPORATION, Osaka (JP)

( * ) Notice: Subject to any disclaimer, the term of this patent is extended or adjusted under 35 U.S.C. 154(b) by 0 days.

(21) Appl. No.: 18/043,870

(22) PCT Filed: Jan. 26, 2022

(86) PCT No.: PCT/JP2022/002900
§ 371 (c)(1),
(2) Date: Mar. 2, 2023

(87) PCT Pub. No.: WO2022/163706
PCT Pub. Date: Aug. 4, 2022

(65) Prior Publication Data
US 2023/0313850 A1    Oct. 5, 2023

(30) Foreign Application Priority Data
Jan. 29, 2021   (JP) ................. 2021-013324

(51) Int. Cl.
*F16D 67/02*   (2006.01)
*B60N 2/16*    (2006.01)

(52) U.S. Cl.
CPC .............. *F16D 67/02* (2013.01); *B60N 2/165* (2013.01)

(58) Field of Classification Search
CPC .... F16D 67/00–02; B60N 2/1635–167; B60N 2/185–1882; B60N 2/2213
See application file for complete search history.

(56) References Cited

U.S. PATENT DOCUMENTS

| | | | |
|---|---|---|---|
| 6,955,251 B2 * | 10/2005 | Kurita .................... | B60N 2/938 192/223.2 |
| 8,424,665 B2 * | 4/2013 | Kawai .................... | F16D 47/04 192/223.2 |

(Continued)

FOREIGN PATENT DOCUMENTS

| | | | | |
|---|---|---|---|---|
| JP | 2010-127418 A | 6/2010 | | |
| JP | 2020-32915 A | 3/2020 | | |
| JP | 2020046017 A | * 3/2020 | ........... | B60N 2/1615 |

OTHER PUBLICATIONS

International Search Report Issued Mar. 22, 2022, in PCT/JP2022/002900, filed on Jan. 26, 2022, 2 pages.

(Continued)

*Primary Examiner* — Ernesto A Suarez
*Assistant Examiner* — James J Taylor, II
(74) *Attorney, Agent, or Firm* — Oblon, McClelland, Maier & Neustadt, L.L.P.

(57) ABSTRACT

Provided is a clutch unit in which an output-side outer ring member is attached to a base plate without welding. A clutch unit (100) includes an output-side clutch (60) and a housing (11) that accommodates the output-side clutch (60). The output-side clutch (60) includes an output-side outer ring member (62). The output-side outer ring member (62) and the housing (11) have an engagement protrusion (62s) and an engagement groove (11s) that engage with each other to restrict relative rotation therebetween.

4 Claims, 7 Drawing Sheets

(56) References Cited

U.S. PATENT DOCUMENTS 11,325,506 B2 * 5/2022 Kanazawa ........... B60N 2/1685
2020/0096057 A1 3/2020 Mikasa et al.

OTHER PUBLICATIONS

Extended European Search Report dated Jun. 24, 2024 issued in European Application No. 22745925.2.

* cited by examiner

CLUTCH UNIT

TECHNICAL FIELD

The present disclosure relates to a clutch unit.

BACKGROUND ART

A clutch unit is known as such described in Patent Literature 1.

CITATION LIST

Patent Literature

Patent Literature 1: JP2020-032915A

SUMMARY OF INVENTION

Technical Problem

In the clutch unit described in Patent Literature 1, an output-side outer ring member is attached to a housing (base plate) by welding. In such a configuration, distortion may occur in the output-side outer ring member and the base plate due to heat during welding. In addition, a welding process is required, and the number of processes increases. Therefore, the present disclosure provides a clutch unit in which an output-side outer ring member is attached to a base plate without welding.

Solution to Problem

A clutch unit for use in a vehicle seat according to the present disclosure includes:
  an operation lever that is rotatable about a rotation axis;
  an output shaft member that is rotatable about the rotation axis and outputs, to a vehicle seat, an operation force applied to the operation lever;
  an input-side clutch that is driven by the operation lever and transmits rotation of the operation lever to the output shaft member;
  an output-side clutch that transmits a rotational torque of the input-side clutch to the output shaft member and limits transmission of a rotational torque from the output shaft member to the input-side clutch; and
  a housing that accommodates at least the output-side clutch, in which
  the output-side clutch includes
    an output-side inner ring member that rotates integrally with the output shaft member about the rotation axis,
    an output-side outer ring member that is attached to the housing, and
    an output-side intermediate transmission member that is rotatably provided between the output-side inner ring member and the output-side outer ring member, and transmits a rotational torque of the output-side inner ring member to the output-side outer ring member, and
  the output-side outer ring member and the housing have engagement structures that engage with each other to restrict relative rotation therebetween.

Advantageous Effects of Invention

According to the present disclosure, it is not necessary to weld the output-side outer ring member and the housing at the time of assembling the clutch unit, and distortion due to welding does not occur. Since the clutch unit is assembled by engaging the output-side outer ring member with the housing, a welding process is not required, and the clutch unit can be easily manufactured.

DESCRIPTION OF EMBODIMENTS

Hereinafter, an embodiment of a clutch unit according to the present disclosure will be described with reference to the drawings.

Figure 1:
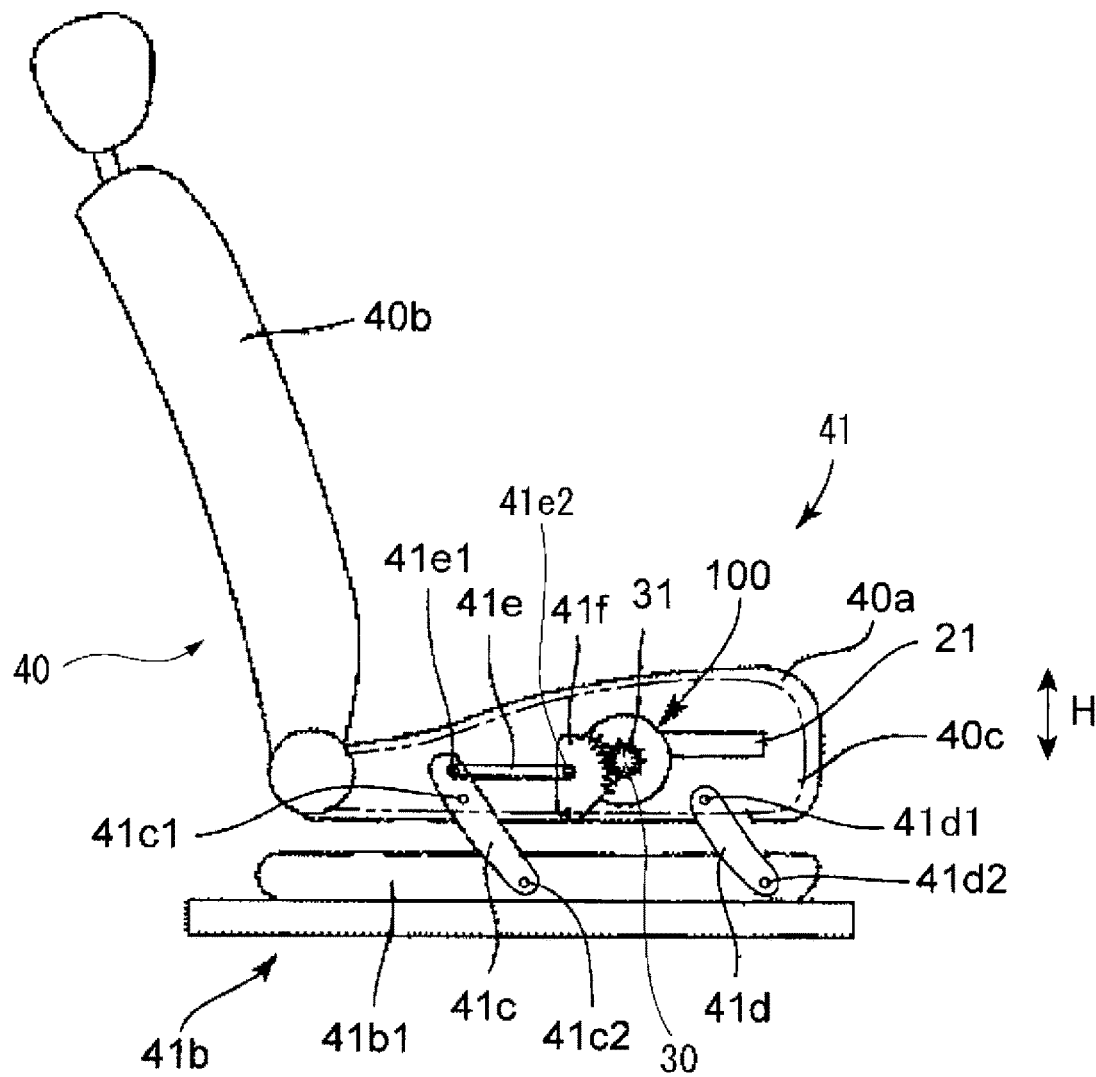
FIG. 1 is a side view showing a state in which a clutch unit according to the present embodiment is applied to a vehicle seat lifter.

FIG. 1 is a side view showing a state in which a clutch unit according to the present embodiment is applied to a vehicle seat lifter. As shown in FIG. 1, a clutch unit 100 according to the present embodiment is used in a vehicle seat 40. The vehicle seat 40 includes a seating seat 40a, a backrest 40b, and a seat frame 40c. The clutch unit 100 is fixed to the seat frame 40c of the seating seat 40a. A vehicle seat lifter 41 is mounted on the vehicle seat 40. The vehicle seat lifter 41 includes the clutch unit 100.

The vehicle seat lifter 41 includes a sector gear 41f and a link mechanism. The clutch unit 100 includes an operation lever 21 that is rotated in forward and reverse directions. A pinion gear 31, which is integral with an output shaft member 30 rotated in forward and reverse directions by the operation lever 21, meshes with the sector gear 41f of the vehicle seat lifter 41.

The link mechanism includes a first link member 41c extending substantially in an upper-lower direction, a second link member 41d extending substantially in the upper-lower direction, and a third link member 41e extending substantially horizontally.

An upper portion of the first link member 41c and an upper portion of the second link member 41d are rotatably connected to the seat frame 40c by shaft members 41c1 and 41d1, respectively. A lower portion of the first link member 41c and a lower portion of the second link member 41d are rotatably connected to a slide movable member 41b1 of a seat slide adjuster 41b by shaft members 41c2 and 41d2, respectively.

One end of the third link member 41e is connected to the first link member 41c by a shaft member 41e1 above the shaft member 41c1. The other end of the third link member 41e is rotatably connected to the sector gear 41f by a shaft member 41e2.

In FIG. 1, when the operation lever 21 is rotated counterclockwise (upward), an input torque (rotational force) in the rotation direction is transmitted to the pinion gear 31, and the pinion gear 31 rotates counterclockwise. Then, the sector gear 41f meshing with the pinion gear 31 rotates clockwise, and the third link member 41e pulls the upper portion of the first link member 41c upward. As a result, both the first link member 41c and the second link member 41d are erected, and a seating surface of the seating seat 40a is raised. After a height H of the seating seat 40a is adjusted, when a force applied to the operation lever 21 is released, the operation lever 21 rotates clockwise and returns to an original position thereof (hereinafter, referred to as a neutral position or a neutral state).

When the operation lever 21 is rotated clockwise (downward), the seating surface of the seating seat 40a is lowered by an operation opposite to the above. When the operation lever 21 is released after height adjustment, the operation lever 21 rotates counterclockwise and returns to the original position thereof (neutral position, neutral state).

In a state in which the operation lever 21 is released, the clutch unit 100 brakes rotation of the output shaft member 30 (pinion gear 31). Therefore, even when a force in the upper-lower direction is applied to the seating seat 40a, the seating seat 40a is prevented from moving in the upper-lower direction.

<Clutch Unit>

Next, the clutch unit 100 according to the present embodiment will be described. Components of the clutch unit 100 described below are basically made of metal unless otherwise specified.

Figure 2:
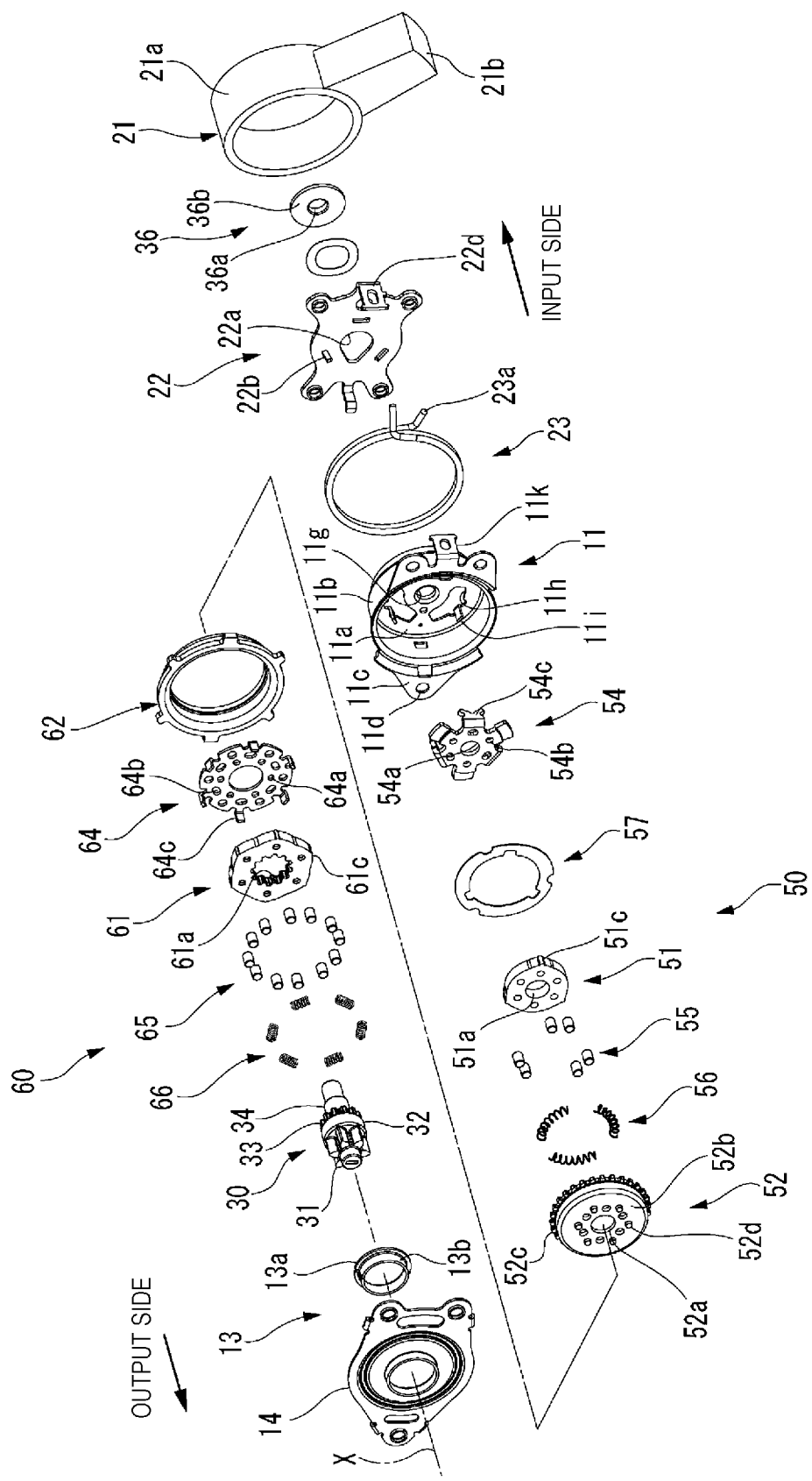
FIG. 2 is an exploded perspective view of the clutch unit.

FIG. 2 is an exploded perspective view of the clutch unit 100. As shown in FIG. 2, the clutch unit 100 includes the operation lever 21, the output shaft member 30, an input-side clutch 50, an output-side clutch 60, and a housing 11.

The input-side clutch 50 is driven (operated) by the operation lever 21 to transmit rotation of the operation lever 21 to the output shaft member 30. The output-side clutch 60 prevents the rotation of the output shaft member 30 even when a force in the upper-lower direction is applied to the seating seat 40a. The input-side clutch 50 and the output-side clutch 60 are accommodated in the housing 11. The housing 11 is a member that does not rotate when the operation lever 21 is operated.

The output shaft member 30 is a shaft member extending from a lower left side to an upper right side in FIG. 2. The output shaft member 30 is rotatable about a rotation axis X extending from the lower left side to the upper right side in FIG. 2. In the following description, a "direction of the rotation axis X" means a direction in which the output shaft member 30 extends. As shown in FIG. 2, the output shaft member 30 penetrates the output-side clutch 60 and the input-side clutch 50 in this order from a left side to a right side in FIG. 2. In the following description, the lower left side in FIG. 2 may be referred to as an output side, and the upper right side in FIG. 2 may be referred to as an input side. In the following description, a circumferential direction and a radial direction are defined with respect to the rotation axis X unless otherwise specified.

The output shaft member 30 is provided with the pinion gear 31, a large-diameter cylindrical portion 32, a spline portion 33, and a small-diameter cylindrical portion 34 in this order from the output side toward the input side.

The pinion gear 31 is provided at an output-side end of the output shaft member 30. The large-diameter cylindrical portion 32 penetrates a metal bush 13 fixed to a cover member 14 of the output-side clutch 60, which will be described later. The small-diameter cylindrical portion 34 penetrates an input-side inner ring member 51 and an input-side outer ring member 52 of the input-side clutch 50, and the housing 11, which will be described later. The spline portion 33 is spline-coupled to an output-side inner ring member 61 of the output-side clutch 60, which will be described later.

A stopper ring 36 is attached to the small-diameter cylindrical portion 34 of the output shaft member 30. The stopper ring 36 has a cylindrical fitting portion 36a and a circular plate-shaped flange portion 36b located on an output side of the fitting portion 36a. The small-diameter cylindrical portion 34 of the output shaft member 30 is fitted into the fitting portion 36a. The flange portion 36b prevents an operation plate 22, the housing 11, the input-side clutch 50, and the output-side clutch 60, which will be described later, from coming out of the output shaft member 30.

The housing 11 is a cup-shaped (bottomed cylindrical) member, and includes a bottom surface 11a and a tubular portion 11b. Two fixing flanges 11c protruding in the radial direction are formed at an output-side end of the tubular portion 11b. The fixing flange 11c has a fixing bolt insertion hole 11d. The housing 11 is fixed to the seat frame 40c by screwing bolts (not shown) inserted into the fixing bolt insertion holes 11d into screw holes of the seat frame 40c. Alternatively, the housing 11 may be fixed to the seat frame 40c by providing a crimped portion on the housing 11 and crimping the crimped portion to the seat frame 40c.

An opening of the cup-shaped housing 11 is closed by the cover member 14. In the present embodiment, the input-side clutch 50 and the output-side clutch 60 are accommodated in a space formed by the housing 11 and the cover member.

The housing 11 is provided with a spring locking piece 11k. The spring locking piece 11k extends toward the input side.

A tubular bearing 11g is formed in a central portion of the bottom surface 11a in the radial direction by burring. The bearing 11g extends from the bottom surface 11a toward the input side. The bearing 11g rotatably supports the output shaft member 30 with respect to the housing 11. The bottom surface 11a has three windows 11h respectively formed of arc-shaped elongated holes and three protruding pieces 11i respectively extending from edges of the windows 11h toward the output side.

The operation lever 21 is made of synthetic resin, for example, and is fixed to the operation plate 22, which will be described later. The operation lever 21 includes a fixed portion 21a fixed to the operation plate 22, and a rod-shaped grip portion 21b extending outward in the radial direction from the fixed portion 21a.

The operation plate 22 is provided between the housing 11 and the operation lever 21 in the direction of the rotation axis X. When an operator grips the grip portion 21b of the operation lever 21 and rotates the operation lever 21 in the forward and reverse directions about the rotation axis X, the operation plate 22 rotates in the forward and reverse directions integrally with the operation lever 21.

The operation plate 22 has an insertion hole 22a at a center thereof in the radial direction. The small-diameter cylindrical portion 34 of the output shaft member 30 is inserted through the insertion hole 22a. The operation plate 22 has three rectangular engagement holes 22b around the insertion hole 22a. Claw portions 54c of an operation bracket 54, which will be described later, are respectively inserted into the engagement holes 22b, and the operation lever 21 rotates together with the operation bracket 54 via the operation plate 22.

An operation piece 22d is provided on an outer peripheral edge of the operation plate 22. The operation piece 22d extends toward the output side.

A return spring 23 is provided on an outer periphery of the housing 11. The return spring 23 is a spring that returns the operation lever 21 and the operation plate 22 to a neutral position when no operation force is applied to the operation lever 21. The return spring 23 is, for example, an arc-shaped helical spring formed by bringing both free end portions 23a close to each other. Both the free end portions 23a of the return spring 23 are locked to the spring locking piece 11k of the housing 11 and the operation piece 22d of the operation plate 22.

In a state (neutral state) in which the operator does not apply an operation force to the operation lever 21, the pair of free end portions 23a of the return spring 23 both abut the spring locking piece 11k and the operation piece 22d, and the operation lever 21 is supported at the neutral position. When the operator rotates the operation lever 21 in the forward and reverse directions about the rotation axis X, the operation plate 22 rotates with respect to the housing 11 together with the operation lever 21. Then, one free end portion 23a of the pair of free end portions 23a maintains a state of engagement with the spring locking piece 11k of the housing 11, and the other free end portion 23a engages with the operation piece 22d of the operation plate 22, and moves in a direction away from the one free end portion 23a against an elastic restoring force of the return spring 23. Therefore, the return spring 23 is bent and a return force to the neutral position is applied.

<Input-side Clutch>

The input-side clutch 50 includes the input-side inner ring member 51, the input-side outer ring member 52, an operation bracket 54 (an example of an operation member), input-side clutch rollers 55 (examples of input-side transmission members), and input-side roller biasing springs 56.

The input-side inner ring member 51 is a cylindrical member extending in the direction of the rotation axis X. The input-side inner ring member 51 has, at a center thereof, an insertion hole 51a through which the small-diameter cylindrical portion 34 of the output shaft member 30 is inserted. Three wedge cam portions 51c bulging outward are formed at equal intervals on an outer peripheral edge of the input-side inner ring member 51. Three protrusions 51b are formed on an input-side surface of the input-side inner ring member 51.

The operation bracket 54 is a plate-shaped member. The operation bracket 54 has, at a center in the radial direction, an insertion hole 54a through which the small-diameter cylindrical portion 34 of the output shaft member 30 is inserted. The operation bracket 54 has three fitting holes 54b (see FIG. 2) into which the protrusions 51b of the input-side inner ring member 51 are fitted. According to a fitting structure of the protrusions 51b of the input-side inner ring member 51 and the fitting holes 54b, the input-side inner ring member 51 and the operation bracket 54, which are separate from each other, are connected to each other so as to rotate integrally with each other and to be relatively movable in the direction of the rotation axis X.

Three claw portions 54c are provided on an outer peripheral edge of the operation bracket 54. The claw portions 54c penetrate the windows 11h formed in the bottom surface 11a of the housing 11, and are fitted into the engagement holes 22b of the operation plate 22, respectively. Accordingly, the operation bracket 54 is connected to the operation plate 22 and rotates integrally with the operation plate 22.

The input-side outer ring member 52 is a dish-shaped member. The input-side outer ring member 52 includes a bottom portion 52b, an outer ring portion 52c, and fixing portions 52d. The bottom portion 52b is a circular plate-shaped portion. An insertion hole 52a through which the small-diameter cylindrical portion 34 of the output shaft member 30 is inserted is formed at a center of the bottom portion 52b in the radial direction. The outer ring portion 52c is a cylindrical portion extending from an outer edge portion of the bottom portion 52b toward the input side. The bottom portion 52b is provided on an output side of the outer ring portion 52c. The fixing portions 52d are protrusions protruding from the bottom portion 52b toward the output side. The fixing portions 52d are coupled to a release bracket 64 of the output-side clutch 60, which will be described later.

Figure 3:
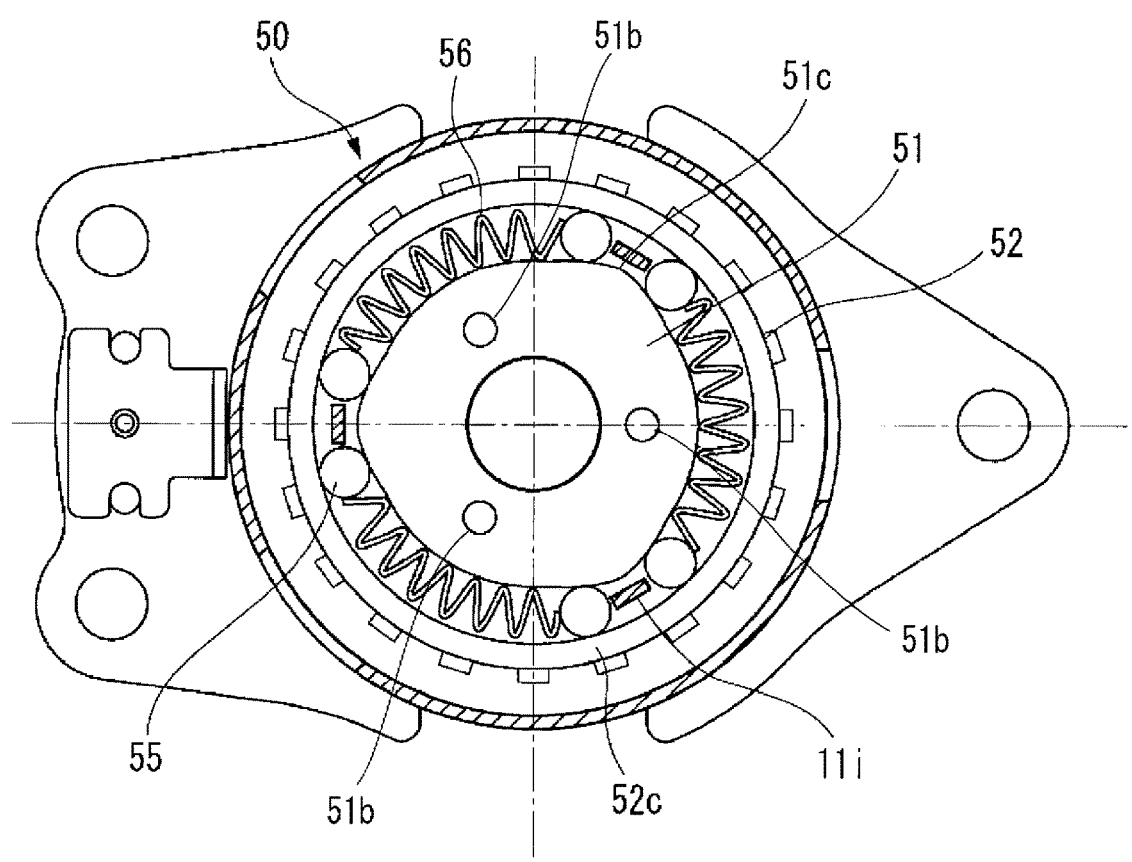
FIG. 3 is a view showing an input-side clutch in a neutral state.

FIG. 3 shows the input-side clutch 50 in the neutral state.

As shown in FIG. 3, a gap is formed between an inner peripheral surface of the input-side outer ring member 52 and an outer peripheral surface of the input-side inner ring member 51. The inner peripheral surface of the input-side outer ring member 52 is a circumferential surface, whereas the outer peripheral surface of the input-side inner ring member 51 is provided with the three wedge cam portions 51c bulging outward. Therefore, spaces whose both ends in the radial direction are tapered in a wedge shape are formed in the gap between the inner peripheral surface of the input-side outer ring member 52 and the outer peripheral surface of the input-side inner ring member 51. The protruding pieces 11i of the housing 11 protrude into the gap. When the input-side inner ring member 51 is rotated by the operation lever 21, the protruding pieces 11i restrict movement of the input-side clutch rollers 55.

The input-side clutch 50 includes six input-side clutch rollers 55 and three input-side roller biasing springs 56. The input-side clutch rollers 55 and the input-side roller biasing spring 56 are disposed between the outer peripheral surface of the input-side inner ring member 51 and the inner peripheral surface of the outer ring portion 52c of the input-side outer ring member 52.

The input-side roller biasing spring 56 is disposed between the wedge cam portions 51c of the input-side inner ring member 51 in the circumferential direction. A pair of input-side clutch rollers 55 are disposed on both sides of the wedge cam portion 51c of the input-side inner ring member 51. The protruding piece 11i of the housing 11 is disposed between the pair of input-side clutch rollers 55. That is, in the gap between the input-side inner ring member 51 and the input-side outer ring member 52, the input-side roller biasing spring 56, the input-side clutch roller 55, the protruding piece 11i, and the input-side clutch roller 55 are provided counterclockwise in this order.

<Operation of Input-side Clutch>

As shown in FIG. 3, in the neutral state, in the input-side clutch 50, the input-side clutch roller 55 is in contact with the input-side roller biasing spring 56, and the input-side clutch roller 55 is biased toward a top portion of the wedge cam portion 51c by the input-side roller biasing spring 56. Therefore, in the neutral state, the input-side clutch roller 55 is bitten between the input-side inner ring member 51 and the input-side outer ring member 52.

In this neutral state, for example, when the operator rotates the operation lever 21 counterclockwise from the neutral position (a position of the operation lever 21 in a no-load state), rotation of the operation lever 21 is transmitted to the input-side inner ring member 51 via the operation plate 22 and the operation bracket 54. That is, the input-side inner ring member 51 tends to rotate counterclockwise together with the operation lever 21.

The input-side clutch roller 55 is provided in a wedge-shaped space narrowed clockwise between the input-side inner ring member 51 and the input-side outer ring member 52. When the input-side inner ring member 51 tends to rotate counterclockwise, the outer peripheral surface of the input-side inner ring member 51 applies a force to bite input-side clutch roller 55 in the wedge-shaped space narrowed clockwise. When receiving such a force, the input-side clutch roller 55 applies a force having a component pressing the inner peripheral surface of the input-side outer ring member 52 outward in the radial direction and a component pressing the inner peripheral surface of the input-side outer ring member 52 counterclockwise. The input-side clutch roller 55 applies a counterclockwise pressing force to the input-side outer ring member 52. In this way, when the input-side inner ring member 51 rotates counterclockwise, the input-side outer ring member 52 rotates counterclockwise together with the input-side clutch rollers 55.

<Output-side Clutch>

With reference back to FIG. 2, the output-side clutch 60 includes the output-side inner ring member 61, an output-side outer ring member 62, the release bracket 64, output-side clutch rollers 65, and output-side roller biasing springs 66.

The output-side outer ring member 62 is a substantially cylindrical member. The output-side outer ring member 62 is coaxial with the output shaft member 30 and is rotatable relative to the output-side inner ring member 61. The output-side outer ring member 62 is disposed on an outer peripheral side of the output-side inner ring member 61.

The output-side inner ring member 61 is coaxial with the output shaft member 30 and rotates integrally with the output shaft member 30. The output-side inner ring member 61 has a diameter smaller than that of the output-side outer ring member 62.

A plurality of grooves are formed in an inner peripheral surface of the output-side inner ring member 61, and serve as a spline portion 61a to which the spline portion 33 of the output shaft member 30 is coupled. Six protrusions 61b are formed on an input-side surface of the output-side inner ring member 61 (see FIG. 4). In FIG. 2, recesses, which are traces left when the protrusions 61b are formed by press working, are visible on an output-side surface. Six wedge cam portions 61c bulging outward are formed at equal intervals on an outer peripheral portion of the output-side inner ring member 61.

The release bracket 64 is a substantially circular plate-shaped member, and is disposed on an input side of the output-side inner ring member 61. The release bracket 64 can transmit a force applied from the input-side clutch 50 to the output-side clutch rollers 65. An outer diameter of the release bracket 64 is larger than an outer diameter of the output-side inner ring member 61 and smaller than an inner diameter of the output-side outer ring member 62. The release bracket 64 is a member separate from the output-side inner ring member 61, the output-side outer ring member 62, the input-side inner ring member 51, and the input-side outer ring member 52.

A plurality of first engagement holes 64a are formed in the release bracket 64. The fixing portions 52d of the input-side outer ring member 52 are respectively inserted into the first engagement holes 64a. Accordingly, the release bracket 64 is rotatable together with the input-side outer ring member 52.

The output-side inner ring member 61 is provided with the protrusions 61b (see FIG. 4) protruding toward the input side. The release bracket 64 has a plurality of elongated holes 64b into which the protrusions 61b are respectively inserted. The elongated holes 64b extend in the circumferential direction. The protrusions 61b are slightly displaceable in the circumferential direction in the elongated holes 64b, respectively. That is, the release bracket 64 and the output-side inner ring member 61 are relatively rotatable within a range in which the protrusions 61b are respectively displaced in the elongated holes 64b.

Six claw portions 64c extending toward the output side are provided on an outer peripheral edge of the release bracket 64. The claw portion 64c is provided between a pair of output-side clutch rollers 65.

Figure 4:
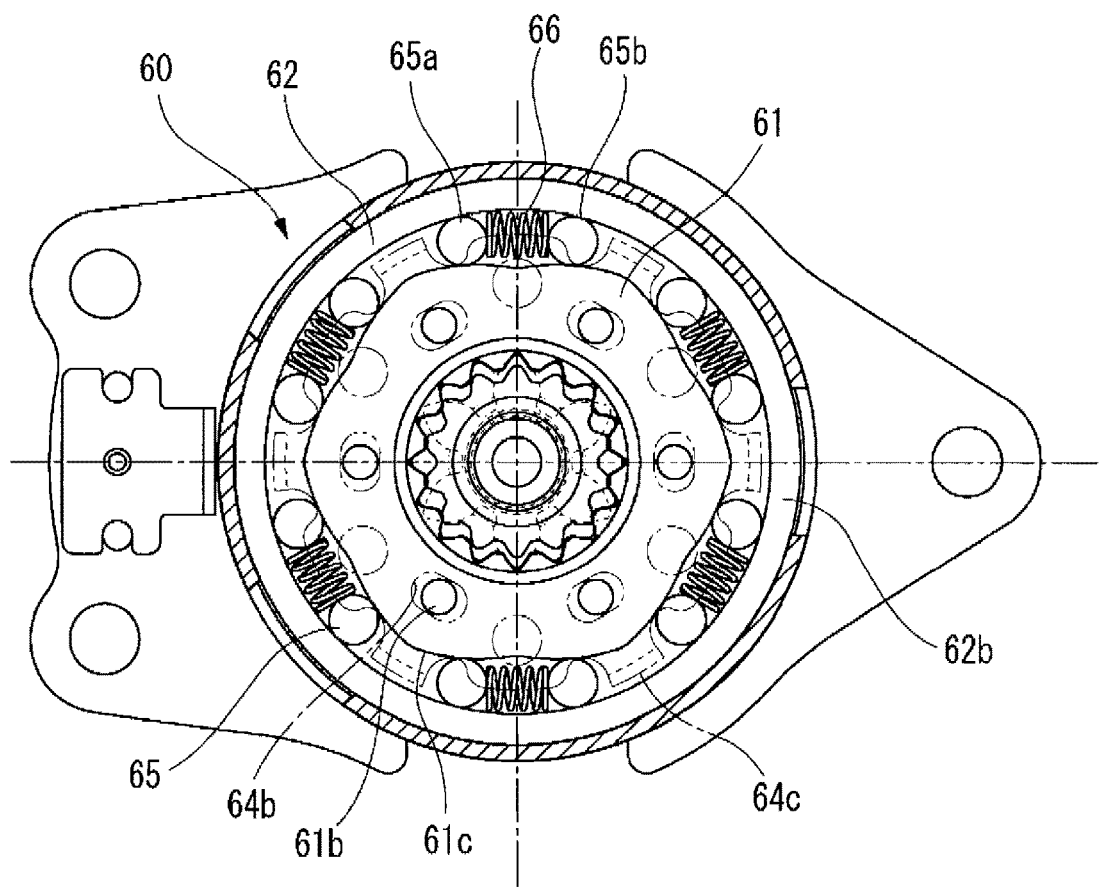
FIG. 4 is a view showing an output-side clutch in the neutral state.

FIG. 4 shows the output-side clutch 60 in the neutral state. As shown in FIG. 4, a gap is formed between an inner peripheral surface of the output-side outer ring member 62 and an outer peripheral surface of the output-side inner ring member 61. The inner peripheral surface of the output-side outer ring member 62 is a circumferential surface, whereas the outer peripheral surface of the output-side inner ring member 61 is provided with the wedge cam portions 61c bulging outward. Therefore, spaces whose both ends in the radial direction are tapered in a wedge shape are formed in the gap between the inner peripheral surface of the output-side outer ring member 62 and the outer peripheral surface of the output-side inner ring member 61. The claw portions 64c of the release bracket 64 protrude into the gap having the paces. When the release bracket 64 is rotated, the claw portions 64c move inside the gap.

The output-side clutch 60 includes 12 output-side clutch rollers 65 and six output-side roller biasing springs 66. The output-side clutch rollers 65 and the output-side roller biasing springs 66 are disposed in the gap between the outer peripheral surface of the output-side inner ring member 61 and the inner peripheral surface of the output-side outer ring member 62. The output-side clutch rollers 65 are members that are disposed between the outer peripheral surface of the output-side inner ring member 61 and the inner peripheral surface of the output-side outer ring member 62 and can transmit a rotational force between the output-side inner ring member 61 and the output-side outer ring member 62. A circumferential surface of the cylindrical output-side clutch roller 65 abuts the claw portion 64c of the release bracket 64.

The output-side roller biasing spring 66 is disposed between the wedge cam portions 61c of the output-side inner ring member 61 in the circumferential direction. A pair of output-side clutch rollers 65 are disposed on both sides of the wedge cam portion 61c of the output-side inner ring member 61. The claw portion 64c of the release bracket 64 is disposed between the pair of output-side clutch rollers 65. The output-side clutch roller 65 is biased toward a top portion of the wedge cam portion 61c by the output-side roller biasing spring 66. In the gap between the output-side inner ring member 61 and the output-side outer ring member 62, the claw portion 64c, the output-side clutch roller 65, the output-side roller biasing spring 66, and the output-side clutch roller 65 are provided counterclockwise in this order.

<Operation of Output-side Clutch>

FIG. 4 shows the output-side clutch 60 in the neutral state. As shown in FIG. 4, in the neutral state, in the output-side clutch 60, the output-side clutch roller 65 is biased toward the top portion of the wedge cam portion 61c by the output-side roller biasing spring 66. Accordingly, the output-side clutch roller 65 is bitten in the wedge-shaped space between the wedge cam portion 61c of the output-side inner ring member 61 and the inner peripheral surface of the output-side outer ring member 62.

A first output-side clutch roller 65a and a second output-side clutch roller 65b located on a clockwise side via the first output-side clutch roller 65a and the output-side roller biasing spring 66 will be described more specifically.

The gap where the first output-side clutch roller 65a is located is tapered counterclockwise. The first output-side clutch roller 65a is biased counterclockwise by the output-side roller biasing spring 66. Therefore, the first output-side clutch roller 65a is bitten counterclockwise between the output-side inner ring member 61 and the output-side outer ring member 62.

The gap where the second output-side clutch roller 65b is located is tapered clockwise. The second output-side clutch roller 65b is biased clockwise by the output-side roller biasing spring 66. Therefore, the second output-side clutch roller 65b is bitten clockwise between the output-side inner ring member 61 and the output-side outer ring member 62.

Here, the output-side outer ring member 62 is immovable with respect to the housing 11. The first output-side clutch roller 65a and the second output-side clutch roller 65b are bitten counterclockwise and clockwise between both the output-side inner ring member 61 and the output-side outer ring member 62. Therefore, the output-side inner ring member 61 and the output-side outer ring member 62 cannot rotate. As a result, the output shaft member 30 spline-coupled to the output-side inner ring member 61 cannot rotate.

In this way, in the neutral state, since the output-side inner ring member 61 and the output-side outer ring member 62 are in a non-rotatable state, the output shaft member 30 does not rotate even when a rotational force is applied to the output shaft member 30 from a side close to the vehicle seat 40. Accordingly, the vehicle seat 40 is fixed while the height thereof is maintained.

Next, a case where the output-side clutch 60 rotates the output shaft member 30 will be described.

When the operation lever 21 is rotated counterclockwise, the input-side outer ring member 52 of the input-side clutch 50 rotates counterclockwise as described above. The fixing portions 52d of the input-side outer ring member 52 are respectively inserted into the first engagement holes 64a of the release bracket 64. Therefore, when the operation lever 21 is rotated counterclockwise, the release bracket 64 also rotates counterclockwise.

The release bracket 64 is coupled to the protrusions 61b of the output-side inner ring member 61 via the elongated holes 64b. Therefore, the release bracket 64 (1) first rotates counterclockwise in a state in which the output-side inner ring member 61 does not rotate, and (2) rotates counterclockwise together with the output-side inner ring member 61 after the protrusions 61b respectively abut edges of the elongated holes 64b.

(1) When the release bracket 64 rotates counterclockwise in the state in which the output-side inner ring member 61 does not rotate, the claw portion 64c of the release bracket 64 presses the output-side clutch roller 65 counterclockwise. Then, an abutment state of the output-side clutch roller 65 between the output-side inner ring member 61 and the output-side outer ring member 62, in which the output-side clutch roller 65 is bitten in the wedge-shaped space narrowed clockwise between the output-side inner ring member 61 and the output-side outer ring member 62, is released.

When the output-side inner ring member 61 tends to rotate counterclockwise, the output-side clutch roller 65, which is bitten in the wedge-shaped space narrowed counterclockwise between the output-side inner ring member 61 and the output-side outer ring member 62, is not subjected to a frictional force between the output-side clutch roller 65 and the output-side inner ring member 61, and an abutment state with the output-side inner ring member 61 is released.

In this way, in a state in which the abutment state of the output-side clutch roller 65 between the output-side inner ring member 61 and the output-side outer ring member 62 is released, the output-side inner ring member 61 is rotatable relative to the output-side outer ring member 62.

After the output-side inner ring member 61 becomes rotatable relative to the output-side outer ring member 62, (2) the protrusions 61b of the output-side inner ring member 61 respectively abut the edges of the elongated holes 64b of the release bracket 64. Then, the output-side inner ring member 61 rotates counterclockwise together with the release bracket 64.

In this way, the output-side clutch 60 does not rotate the output shaft member 30 when no operation force is applied to the operation lever 21 in the neutral state, and rotates the output shaft member 30 only when an operation force is applied to the operation lever 21.

<Output-side Outer Ring Member and Housing>

As described above, the clutch unit 100 for use in the vehicle seat 40 according to the present embodiment includes:

the operation lever 21 rotatable about the rotation axis X;

the output shaft member 30 that is rotatable about the rotation axis X and outputs, to the vehicle seat 40, an operation force applied to the operation lever 21;

the input-side clutch 50 that is driven by the operation lever 21 and transmits rotation of the operation lever 21 to the output shaft member 30;

the output-side clutch 60 that transmits a rotational torque of the input-side clutch 50 to the output shaft member 30 and limits transmission of a rotational torque from the output shaft member 30 to the input-side clutch 50; and the housing 11 that accommodates at least the output-side clutch 60.

Further, the output-side clutch 60 includes the output-side inner ring member 61 that rotates integrally with the output shaft member 30 about the rotation axis X, the output-side outer ring member 62 attached to the housing 11 and restricted from rotating, and an output-side intermediate transmission member (output-side clutch roller 65) that is rotatably provided between the output-side inner ring member 61 and the output-side outer ring member 62, and transmits a rotational torque of the output-side inner ring member 61 to the output-side outer ring member 62.

Figure 5:
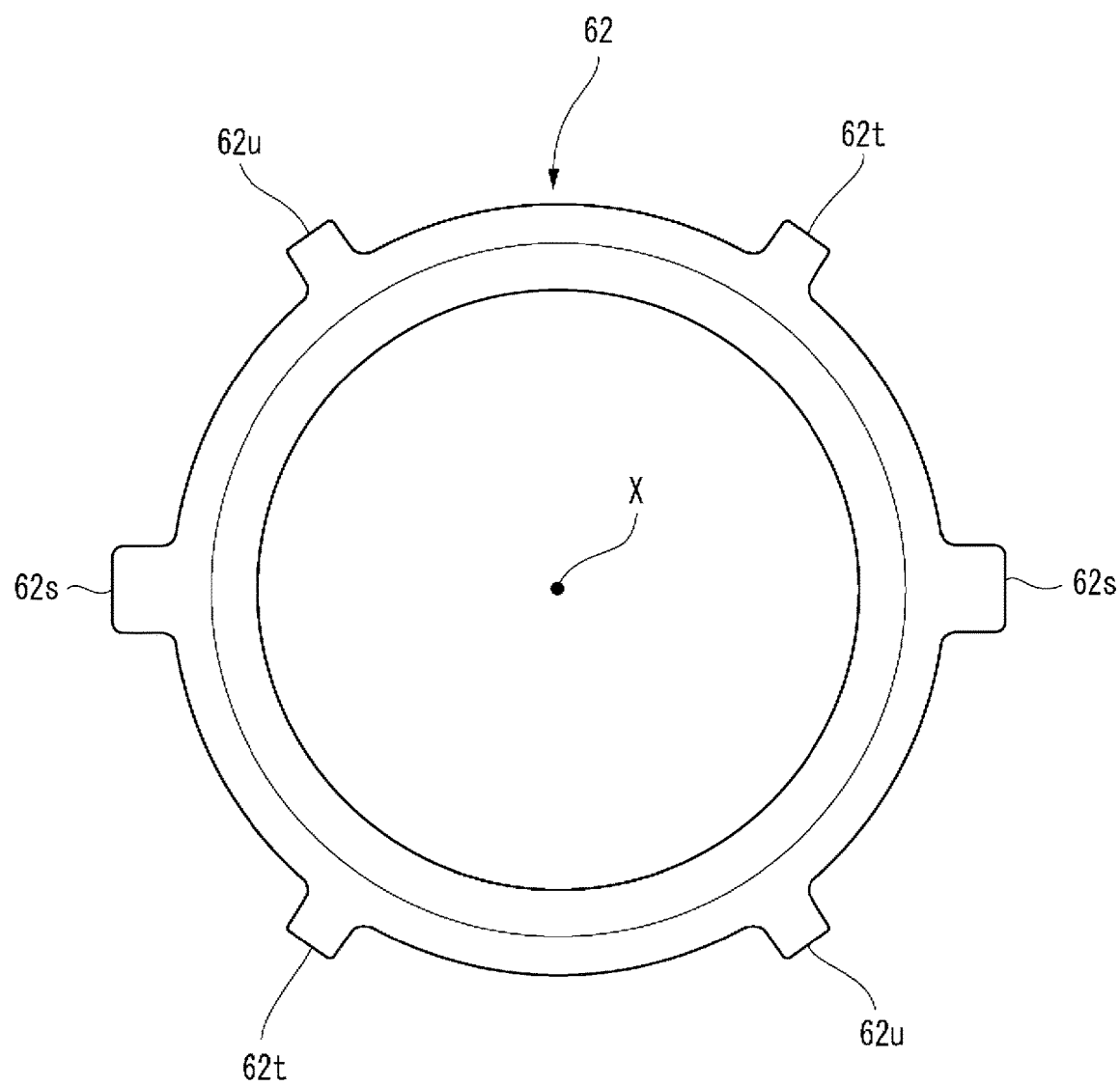
FIG. 5 is a view showing an output-side outer ring member.
Figure 6:
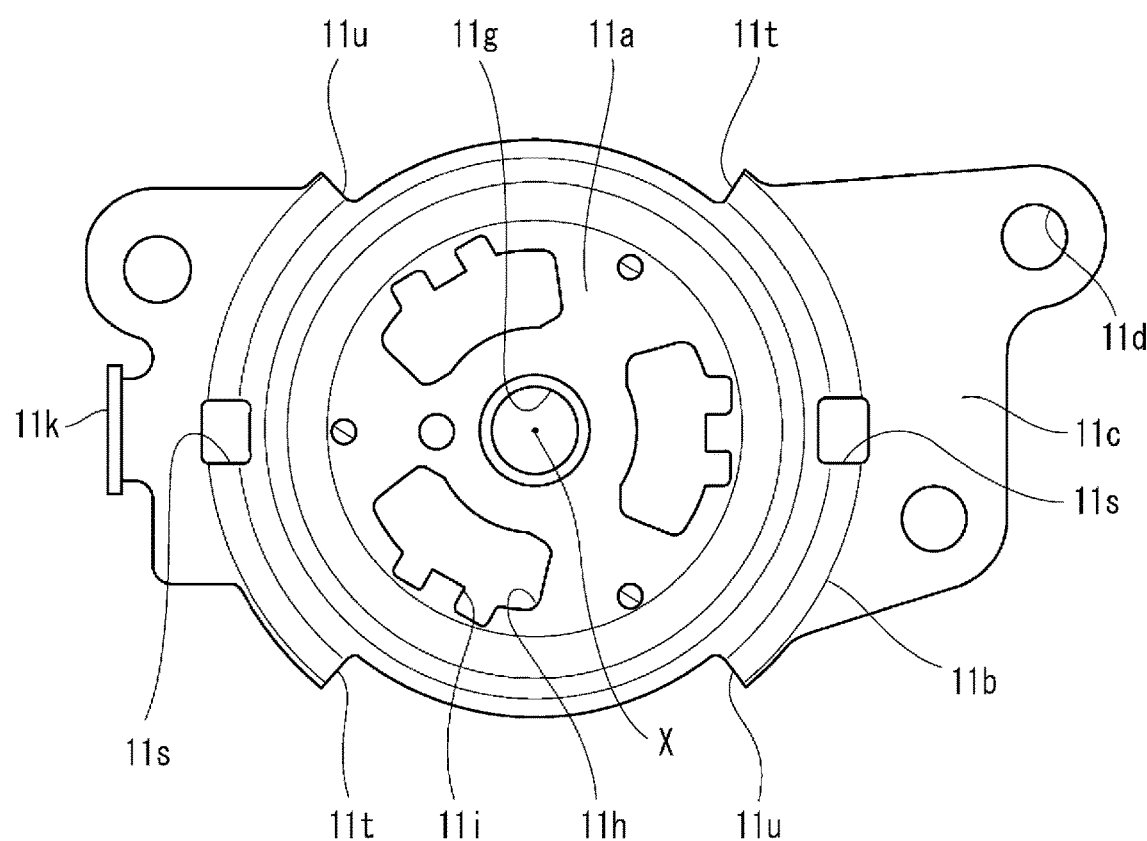
FIG. 6 is a view showing a housing.
Figure 7:
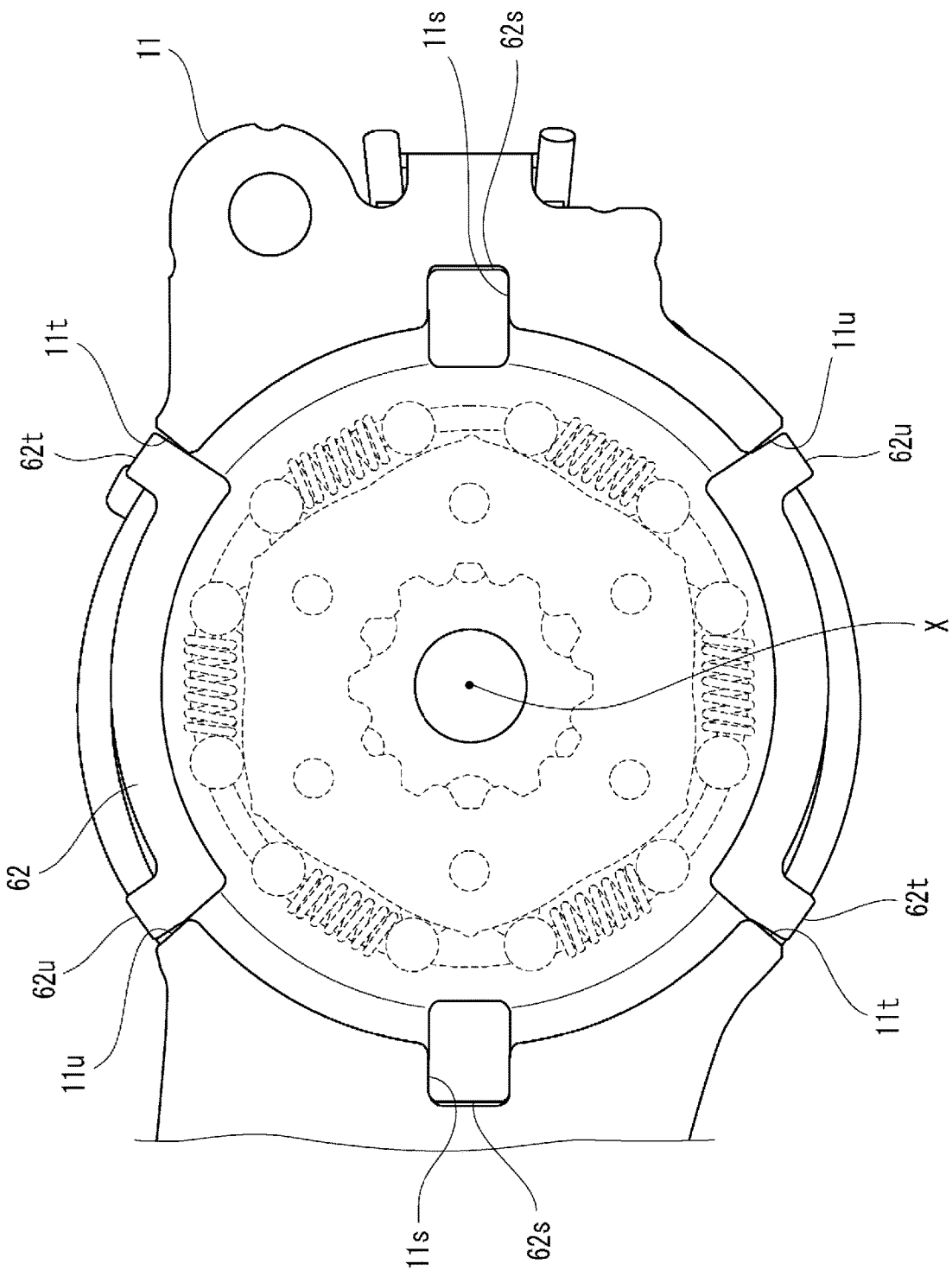
FIG. 7 is a view showing the output-side outer ring member attached to the housing.

FIG. 5 is a view showing the output-side outer ring member 62. FIG. 6 is a view showing the housing 11. FIG. 7 is a view showing the output-side outer ring member 62 attached to the housing 11.

As shown in FIGS. 5 to 7, the output-side outer ring member 62 and the housing 11 have engagement structures 62s and 11s that engage with each other to restrict relative rotation therebetween.

In this way, in the clutch unit 100 according to the present embodiment, the output-side outer ring member 62 is fixed to the housing 11 by the engagement structures 62s and 11s. As compared with a case where the output-side outer ring member is fixed to the housing by welding as in Patent Literature 1, which is different from the present embodiment, the clutch unit 100 according to the present embodiment does not require a welding process at the time of assembly. Since the clutch unit 100 can be manufactured by assembling the members of the clutch unit 100 without using welding after preparing the members, a manufacturing cost can be reduced. Further, at the time of manufacturing the clutch unit 100, distortion of the output-side outer ring member 62 and the housing 11 due to welding does not occur, and accuracy of a product can be improved.

In the present embodiment, the engagement structures 62s and 11s include the engagement protrusions 62s formed on the output-side outer ring member 62 and the engagement grooves 11s formed in the housing 11. The engagement protrusion 62s extends outward in the radial direction of the rotation axis X from an outer peripheral portion of the output-side outer ring member 62. The engagement groove 11s is a groove that engages with the engagement protrusion 62s.

In the shown example, the engagement protrusion 62s includes a pair of contact surfaces extending outward in the radial direction of the rotation axis X from an outer peripheral surface of the output-side outer ring member 62, and a tip end surface connecting tip end portions of the contact surfaces in the radial direction.

The engagement grooves 11s are formed in portions of the tubular portion 11b of the housing 11 that are connected to the pair of fixing flanges 11c. The engagement groove 11s is a hole formed by cutting the housing 11. The engagement groove 11s includes a pair of contact surfaces extending in the radial direction of the rotation axis X and a connection surface connecting end portions of the pair of contact surfaces in the radial direction. The contact surface of the engagement groove 11s has a shape corresponding to the contact surface of the engagement protrusion 62s. The contact surfaces face each other in the circumferential direction of the rotation axis X and are contactable.

In the clutch unit 100 according to the present embodiment, when the output-side outer ring member 62 tends to rotate about the rotation axis X with respect to the housing 11, the engagement protrusion 62s of the output-side outer ring member 62 applies a force to a side surface of the engagement groove 11s. At this time, since the engagement protrusion 62s extends outward in the radial direction, the engagement protrusion 62s can apply the force to the side surface of the engagement groove 11s at a position far from a rotation center (the rotation axis X), and a magnitude of the force applied to the contact surface between the engagement protrusion 62s and the engagement groove 11s can be reduced. Therefore, a strength required for the engagement protrusion 62s and the engagement groove 11s can be reduced.

In the clutch unit 100 according to the present embodiment, a pair of engagement protrusions 62s are formed at positions that are point-symmetric about the rotation axis X as shown in FIG. 5.

A load is distributed to the two engagement protrusions 62s and the two engagement grooves 11s, and concentration of the load on any one of the engagement protrusions 62s and the engagement grooves 11s can be reduced. Since the engagement protrusions 62s are point-symmetric, the output-side outer ring member 62 can be easily assembled to the housing 11.

In the clutch unit 100 according to the present embodiment, the output-side outer ring member 62 has auxiliary engagement protrusions 62t and 62u extending radially outward, and the housing 11 has auxiliary engagement grooves 11t and 11u engageable with the auxiliary engagement protrusions 62t and 62u.

In the shown example, two pairs of auxiliary engagement protrusions 62t and 62u and two pairs of auxiliary engagement grooves 11t and 11u are formed.

The force applied to the contact surface between the engagement protrusion 62s and the engagement groove 11s can also be applied to auxiliary contact surfaces between the auxiliary engagement protrusions 62t and 62u and the auxiliary engagement grooves 11t and 11u, and a force applied to each contact surface can be reduced.

In the clutch unit 100 according to the present embodiment, the auxiliary engagement protrusions 62t and 62u and the auxiliary engagement grooves 11t and 11u face each other with gaps therebetween in the circumferential direction of the rotation axis X.

In other words, the housing 11 has the pair of engagement grooves 11s, the pair of first auxiliary engagement grooves 11t, and the pair of second auxiliary engagement grooves 11u. The engagement groove 11s, the first auxiliary engagement groove 11t, and the second auxiliary engagement groove 11u are arranged in this order in the circumferential direction of the rotation axis X, and a gap is formed between the first auxiliary engagement groove 11t and the second auxiliary engagement groove 11u by cutting.

When assembling the clutch unit 100, the output-side outer ring member 62 can be easily assembled to the housing 11 by disposing the first auxiliary engagement protrusion 62t to engage with the first auxiliary engagement groove 11t and the second auxiliary engagement protrusion 62u to engage with the second auxiliary engagement groove 11u in the gap in the circumferential direction.

In the clutch unit 100 according to the present embodiment, a plurality of auxiliary engagement protrusions 62t and 62u are formed on the output-side outer ring member 62.

A force applied to the contact surface between the engagement protrusion 62s and the engagement groove 11s can also be applied to the auxiliary contact surfaces between the auxiliary engagement protrusions 62t and 62u and the auxiliary engagement grooves 11t and 11u, and a load acting on each contact surface can be further reduced.

In the clutch unit 100 according to the present embodiment, two pairs of auxiliary engagement protrusions 62t and 62u are formed on the output-side outer ring member 62 at positions that are point-symmetric about the rotation axis X, respectively, and the pair of engagement protrusions 62s and the two pairs of auxiliary engagement protrusions 62t and 62u are formed at positions that are rotationally symmetric about the rotation axis X.

According to such a configuration, since directionality is not required at the time of assembling the output-side outer ring member 62, the output-side outer ring member 62 can be more easily assembled to the housing 11.

In the clutch unit 100 according to the present embodiment, the auxiliary engagement protrusions 62t and 62u each have a smaller protrusion amount in the radial direction of the rotation axis X than that of the engagement protrusion 62s.

Accordingly, it is possible to prevent the clutch unit 100 from increasing in size in the radial direction. In addition, an assembly worker can easily distinguish between the engagement protrusion 62s and the auxiliary engagement protrusions 62t and 62u.

Although the embodiment of the present disclosure has been described above, it is needless to say that the technical scope of the present disclosure should not be construed as being limited by the description of the embodiment. It is understood by those skilled in the art that the present embodiment is merely an example, and various modifications of the embodiment are possible within the scope of the present disclosure described in the claims. The technical scope of the present disclosure should be determined based on the scope of the present disclosure described in the claims and the scope of equivalents thereof.

For example, an example in which a pair of engagement protrusions 62s and a pair of engagement grooves 11s are formed has been described in the above-described embodiment, but each may be formed singly or three or more. The auxiliary engagement protrusions 62t and 62u and the auxiliary engagement grooves 11t and 11u may not be formed. Shapes and positions of the engagement protrusions and the engagement grooves are not limited to those described above.

The present application claims priority based on Japanese Application No. 2021-013324 filed on Jan. 29, 2021, and incorporates all the contents thereof.

INDUSTRIAL APPLICABILITY

According to the present disclosure, it is not necessary to weld the output-side outer ring member and the housing at the time of assembling the clutch unit, and distortion due to welding does not occur. Since the clutch unit is assembled by engaging the output-side outer ring member with the housing, a welding process is not required, and the clutch unit can be easily manufactured.

REFERENCE SIGNS LIST 11 housing
11a bottom surface
11j anti-rotation hole
11s engagement groove
11t auxiliary engagement groove (first auxiliary engagement groove)
11u auxiliary engagement groove (second auxiliary engagement groove)
21 operation lever
22 operation plate
23 return spring
30 output shaft member
31 pinion gear
32 large-diameter cylindrical portion
33 spline portion
34 small-diameter cylindrical portion
36 stopper ring
40 vehicle seat
40a seating seat
40c seat frame
41 vehicle seat lifter
50 input-side clutch
51 input-side inner ring member
52 input-side outer ring member
52e first locking portion
54 operation bracket
55 input-side clutch roller
56 input-side roller biasing spring
57 rotation stop member
60 output-side clutch
61 output-side inner ring member
62 output-side outer ring member
62s engagement protrusion
62t auxiliary engagement protrusion (first auxiliary engagement protrusion)
62u auxiliary engagement protrusion (second auxiliary engagement protrusion)
64 release bracket
65 output-side clutch roller
66 output-side roller biasing spring
100 clutch unit

The invention claimed is:

1. A clutch unit for use in a vehicle seat, the clutch unit comprising:
   an operation lever that is rotatable about a rotation axis;
   an output shaft member that is rotatable about the rotation axis and outputs, to the vehicle seat, an operation force applied to the operation lever;
   an input-side clutch that is driven by the operation lever and transmits rotation of the operation lever to the output shaft member;
   an output-side clutch that transmits a rotational torque of the input-side clutch to the output shaft member and limits transmission of a rotational torque from the output shaft member to the input-side clutch; and
   a housing that accommodates at least the output-side clutch
   wherein the output-side clutch includes:
      an output-side inner ring member that rotates integrally with the output shaft member about the rotation axis;
      an output-side outer ring member that is attached to the housing; and
      an output-side intermediate transmission member that is rotatably provided between the output-side inner ring member and the output-side outer ring member, and transmits a rotational torque of the output-side inner ring member to the output-side outer ring member,
   wherein the output-side outer ring member and the housing have engagement structures that engage with each other to restrict relative rotation therebetween,
   wherein the engagement structures include an engagement protrusion and an auxiliary engagement protrusion each extending outward in a radial direction of the rotation axis from an outer peripheral portion of the output-side outer ring member,
   wherein the auxiliary engagement protrusion has a smaller protrusion amount in the radial direction of the rotation axis than that of the engagement protrusion,
   wherein the engagement structures include an engagement groove formed in the housing and to be engaged with the engagement protrusion,
   wherein the housing has an auxiliary engagement groove engageable with the auxiliary engagement protrusion, and
   wherein the auxiliary engagement protrusion and the auxiliary engagement groove face each other with a gap therebetween in a circumferential direction of the rotation axis.

2. The clutch unit according to claim 1,
   wherein the engagement protrusion is included in a pair of engagement protrusions formed at positions that are point-symmetric about the rotation axis.

3. The clutch unit according to claim 1,
   wherein the auxiliary engagement protrusion is included in a plurality of auxiliary engagement protrusions formed on the output-side outer ring member.

4. A clutch unit for use in a vehicle seat, the clutch unit comprising:
   an operation lever that is rotatable about a rotation axis;
   an output shaft member that is rotatable about the rotation axis and outputs, to the vehicle seat, an operation force applied to the operation lever;
   an input-side clutch that is driven by the operation lever and transmits rotation of the operation lever to the output shaft member;
   an output-side clutch that transmits a rotational torque of the input-side clutch to the output shaft member and limits transmission of a rotational torque from the output shaft member to the input-side clutch; and a housing that accommodates at least the output-side clutch wherein the output-side clutch includes:

an output-side inner ring member that rotates integrally with the output shaft member about the rotation axis;

an output-side outer ring member that is attached to the housing; and an output-side intermediate transmission member that is rotatably provided between the output-side inner ring member and the output-side outer ring member, and transmits a rotational torque of the output-side inner ring member to the output-side outer ring member, wherein the output-side outer ring member and the housing have engagement structures that engage with each other to restrict relative rotation therebetween, wherein the engagement structures include an engagement protrusion and an auxiliary engagement protrusion each extending outward in a radial direction of the rotation axis from an outer peripheral portion of the output-side outer ring member, wherein the auxiliary engagement protrusion has a smaller protrusion amount in the radial direction of the rotation axis than that of the engagement protrusion, wherein the engagement structures include an engagement groove formed in the housing and to be engaged with the engagement protrusion, wherein the housing has an auxiliary engagement groove engageable with the auxiliary engagement protrusion, wherein the auxiliary engagement protrusion is included in one of two pairs of auxiliary engagement protrusions formed on the output-side outer ring member at positions that are point-symmetric about the rotation axis, and wherein the engagement protrusion is included in a pair of engagement protrusions and the two pairs of auxiliary engagement protrusions are formed at positions that are rotationally symmetric about the rotation axis.

* * * * *